(12) United States Patent
Itai et al.

(10) Patent No.: US 6,511,716 B1
(45) Date of Patent: Jan. 28, 2003

(54) METHOD OF SURFACE TREATMENT FOR RECORDING MEDIUM

(75) Inventors: Yuichiro Itai, Kawasaki (JP); Masaki Katayama, Kawasaki (JP); Yoshiharu Kasamatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/008,749

(22) Filed: Dec. 6, 2001

(30) Foreign Application Priority Data

Jun. 27, 2001 (JP) ........................................ 2001-194373

(51) Int. Cl.⁷ .................................................. C08J 7/04
(52) U.S. Cl. ........................ 427/515; 427/130; 427/131; 427/340; 427/407.1; 427/558; 427/559
(58) Field of Search ................................ 427/515, 558, 427/559, 340, 131, 130, 407.1

(56) References Cited

U.S. PATENT DOCUMENTS 4,849,305 A * 7/1989 Yanagisawa ................. 428/695

* cited by examiner

*Primary Examiner*—Bernard Pianalto
(74) *Attorney, Agent, or Firm*—Greer, Burns & Carin, Ltd.

(57) ABSTRACT

Ultraviolet rays are radiated over a lubricant film formed on the surface of a recording medium such as a hard disk. The recording medium is then subjected to exposure to a bases. The radiation of the ultraviolet rays allows the lubricant film to uniformly spread over the surface of the recording medium. The repellency can be enhanced over the surface of the recording medium. The friction can be reduced on the recording medium. Moreover, when the recording medium is exposed to the base, organic acid existing on the surface of the recording medium and/or in the lubricant film can be transformed into salt. The organic acid can be washed off or removed from the surface of the recording medium and/or out of the lubricant film in this manner. Less organic acid greatly contributes to prevention of generation of corrosion mounds on the recording medium over a longer period.

8 Claims, 3 Drawing Sheets

METHOD OF SURFACE TREATMENT FOR RECORDING MEDIUM

BACKGROUND OF THE INVENTION

1. Field of the Invention

The present invention relates to a recording medium Such as a magnetic recording disk incorporated into a hard disk drive (HDD), for example. In particular, the invention relates to a method of surface treatment for forming a lubricant film over the surface of the recording medium.

2. Description of the Prior Art

Organic acid such as oxalic acid and acetic acid exists over a diamond-like-carbon (DLC) surface layer of the magnetic disk as well as within a lubricant film formed to spread over the surface of the magnetic recording disk. The organic acid tends to get dissolved into water or moisture on the surface of the magnetic recording disk. The dissolved organic acid often induces corrosion or rust of the magnetic recording disk. The corrosion results in mounds on the surface of the magnetic recording disk.

For example, the lubricant film is subjected to exposure to ultraviolet rays in the process of production of the recording medium. Radiation of the ultraviolet rays serves to uniformly spread the lubricant film over the surface of the magnetic recording disk. In addition, the magnetic recording disk is allowed to obtain a higher repellency over the surface thereof. The magnetic recording disk may suffer from less friction. On the other hand, the radiation of the ultraviolet rays serves to generate organic acid of quite an amount over the surface of the magnetic recording disk, as well as in the lubricant film. Corrosion of the magnetic recording disk may be promoted.

A hard disk drive is supposed to require a smaller flying height of a flying head slider so as to realize the magnetic recordation of a still higher density. As the flying height gets smaller, the head slider suffers from a higher probability of colliding against corrosion mounds on the magnetic recording disk during rotation of the magnetic recording disk. The collision of the head slider against the corrosion mound may induce damages of the head slider and/or a read/write element on the head slider.

SUMMARY OF THE INVENTION

It is accordingly an object of the present invention to provide a method of surface treatment for a recording medium, which is capable of preventing generation of corrosion mounds on the recording medium.

According to a first aspect of the present invention, there is provided a method of surface treatment for a recording medium, comprising: radiating an ultraviolet ray over a lubricant film formed on the surface of the recording medium; and subjecting the recording medium to exposure to a base after radiation of the ultraviolet ray.

In general, when the ultraviolet ray is radiated over the lubricant film on the recording medium, the lubricant film is allowed to uniformly spread over the surface of the recording medium. At the same time, the repellency can be enhanced over the surface of the recording medium. The friction can be reduced on the recording medium.

Moreover, when the recording medium is exposed to the base, organic acid existing on the surface of the recording medium and/or in the lubricant film can be transformed into salt. The organic acid can thus be consumed. The organic acid can be washed off or removed from the surface of the recording medium and/or out of the lubricant film in this manner. Less organic acid greatly contributes to prevention of generation of corrosion mounds over a longer period. In particular, the ultraviolet radiation leads to generation of organic acid in quite a quantity on the surface of the recording medium and/or in the lubricant film. However, it has been proved that the base is remarkably effective to reduce the quantity of the corrosion mounds on the recording medium.

The base may be a weak base. In particular, the base may be an amine compound. Such an amine compound may include an aliphatic amine compound, for example.

When the recording medium is exposed to the base, the recording medium may be dipped into a solution including the base. The solution may comprise a solvent such as hydrofluoroether compound, for example. The base may be resolved into the solvent.

The lubricant film may comprise a perfluoroether compound, for example. In particular, the perfluoroether compound may be a perfluoropolyether compound having piperonyl radicals at both terminals.

The ultraviolet ray preferably has a wavelength equal to or smaller than 200 nm. The ultraviolet ray of this wavelength is supposed to realize an efficient generation of ozone molecules out of oxygen molecules. Accordingly, reaction of oxidation can be promoted over the surface of the recording medium. The oxidation serves to uniformly spread the lubricant film over the surface of the recording medium.

According to a second aspect of the present invention, there is provided a method of surface treatment for a recording medium, comprising: forming a lubricant film over the surface of the recording medium; and subjecting the recording medium to exposure to a base.

When the recording medium is exposed to the base, organic acid existing on the surface of the recording medium and/or in the lubricant film can be transformed into salt. The organic acid can thus be consumed. The organic acid can be washed off or removed from the surface of the recording medium and/or out of the lubricant film in this manner. Less organic acid greatly contributes to prevention of generation of corrosion mounds over a longer period.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
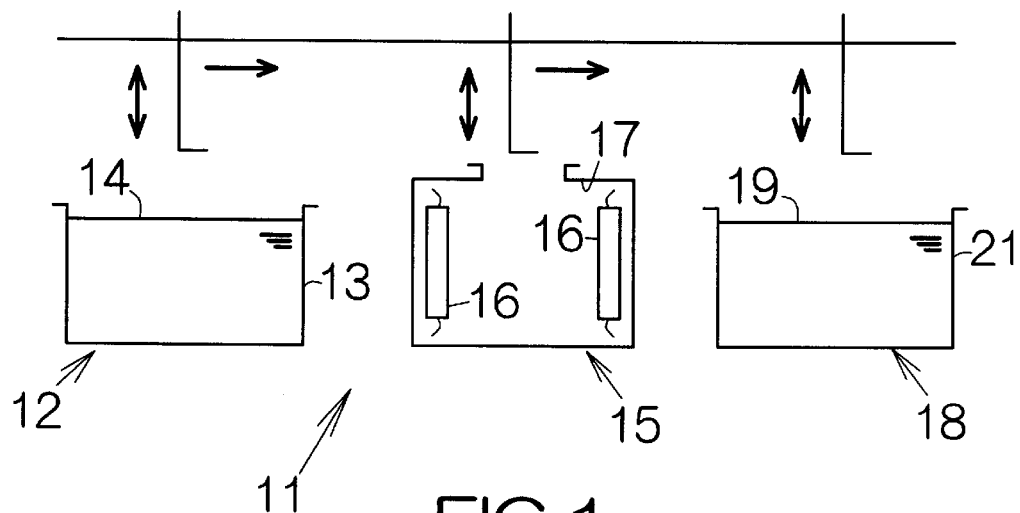
FIG. 1 is a schematic view illustrating the structure of a surface treatment system.

FIG. 1 schematically illustrates the structure of a surface treatment system for a recording medium. The surface treatment system 11 includes a lubricant application apparatus 12 for application of a lubricant. A lubricant bath 13 is filled with a solution 14 containing a lubricant in the lubricant application apparatus 12. A lubricant such as perfluoroether compounds may be resolved into a fluoride resolvent, for example, in the solution 14. The fluoride resolvent may contain the lubricant in an amount ranging between 0.005 wt % and 0.05 wt %, for example. In particular, the lubricant may be perfluoropolyether having piperonyl radicals at both terminals.

The surface treatment system 11 further includes an ultraviolet radiation apparatus 15 for radiation of ultraviolet rays. The ultraviolet radiation apparatus 15 comprises ultraviolet lamps 16 disposed within a chamber 17, for example. The ultraviolet lamps 16 are designed to radiate at least a first ultraviolet ray of the wavelength equal to or smaller than 200 nm, such as of 185 nm, and a second ultraviolet ray of the wavelength over 200 nm, such as of 254 nm, for example. An oxygenic atmosphere may be established within the chamber 17. Air may be filled within the chamber 17.

The surface treatment system 11 still further includes a washing apparatus 18. The washing apparatus 18 comprises a washing bath 21 filled with a solution 19 containing a base. A weak base such as amine compounds may be resolved into a fluoride resolvent such as hydrofluoroether, for example, in the solution 19. The fluoride resolvent may contain an aliphatic primary amine compound in an amount ranging between 0.001 wt % and 1.0 wt %, for example.

Figure 2:
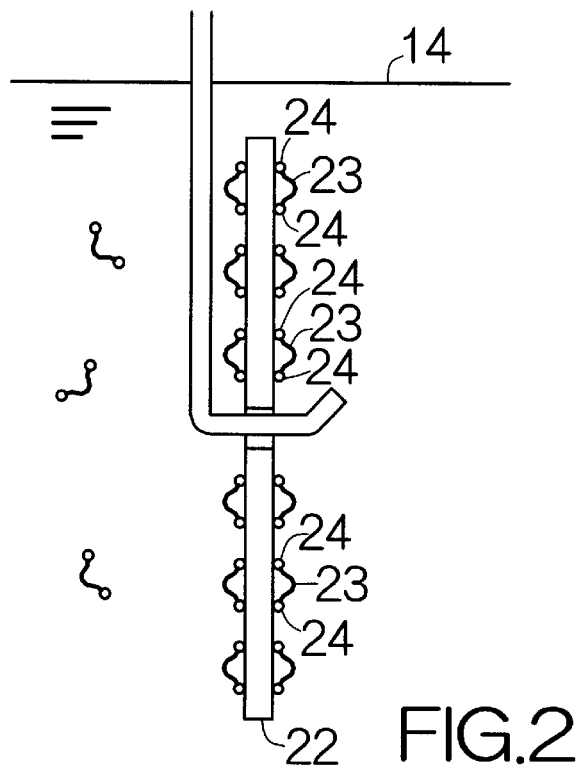
FIG. 2 illustrates the process of forming a lubricant film over the surface of a magnetic recording disk.

Next, a detailed description will be made on a method of surface treatment employing the aforementioned surface treatment system 11. First of all, a magnetic recording medium or disk 22 is dipped into the solution 14 containing the lubricant, as shown in FIG. 2. Perfluoropolyether molecules 23 as the lubricant are allowed to adhere to the surface of the magnetic recording disk 22 in the solution 14. A lubricant film is formed to spread over the surface of the magnetic recording disk 22 in this manner. Piperonyl radicals 24 exhibit a superior affinity to a diamond-like-carbon (DLC) surface layer of the magnetic recording disk 22. The perfluoropolyether molecules 23 are thus allowed to adhere to the surface of the magnetic recording disk 22 at a higher stability.

Prior to the aforementioned formation of the lubricant film, the magnetic recording disk 22 may be dipped into a washing liquid, not shown. Polar liquid such as water, lower alcohol, acetone, and the like, may be employed as the washing liquid, for example. The polar liquid serves to wash off hydrophilic ionic contaminants, such as nitric acid ions, phosphoric acid ions, sulfuric acid ions, oxalic acid ions, and the like, from the surface of the magnetic recording disk 22. Otherwise, an organic solvent such as toluene, hexane, and the like, may be employed as the washing liquid. The organic solvent serves to wash off hydrophobic humic contaminants, such as silicon organic compounds, for example, from the surface of the magnetic recording disk 22.

Figure 3:
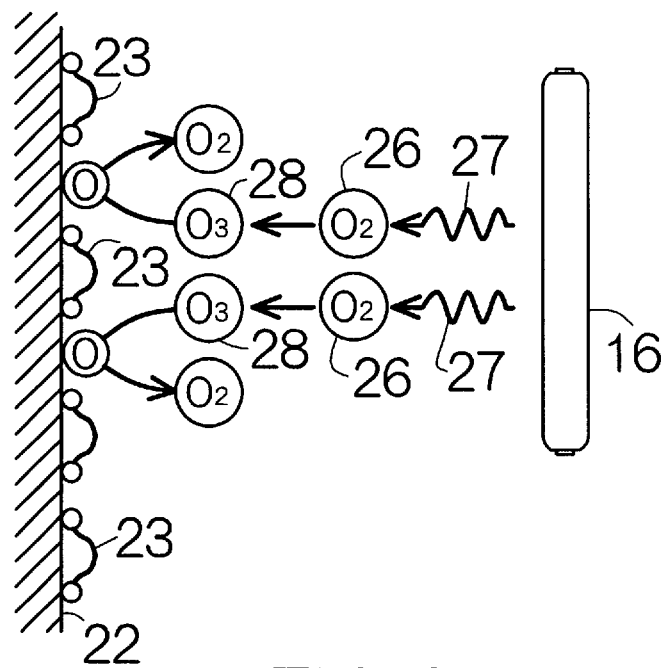
FIG. 3 illustrates the process of oxidation induced over the surface of the magnetic recording disk.

Thereafter, the magnetic recording disk 22 is brought into the ultraviolet radiation apparatus 15. When the ultraviolet lamps 16 are turned on in the chamber 17, the ultraviolet rays 27 serves to transform oxygen molecules 26, which float within the chamber 17, into ozone molecules 28, as shown in FIG. 3. The generated ozone molecules 28 promote reaction of oxidation over the surface of the magnetic recording disk 22. The oxidation in this manner enhances the affinity between the perfluoropolyether molecules 23 and the surface of the magnetic recording disk 22. The perfluoropolyether molecules 23 are thus allowed to uniformly spread over the surface of the magnetic recording disk 22. In particular, the ultraviolet rays 27 of the wavelength equal to or smaller than 200 nm are supposed to promote generation of the ozone molecules 28.

When the ultraviolet rays 27 are radiated over the perfluoropolyether molecules 23 on the surface of the magnetic recording disk 22, the perfluoropolyether molecules 23 are turned into macromolecules. The macromolecules serve to enhance the repellency of the lubricant film. At the same time, macromolecules serve to reduce the friction of the lubricant film. In particular, the ultraviolet rays 27 of the wavelength larger than 200 nm are supposed to promote generation of the macro molecules of the perfluoropolyether molecules 23.

Figure 4:
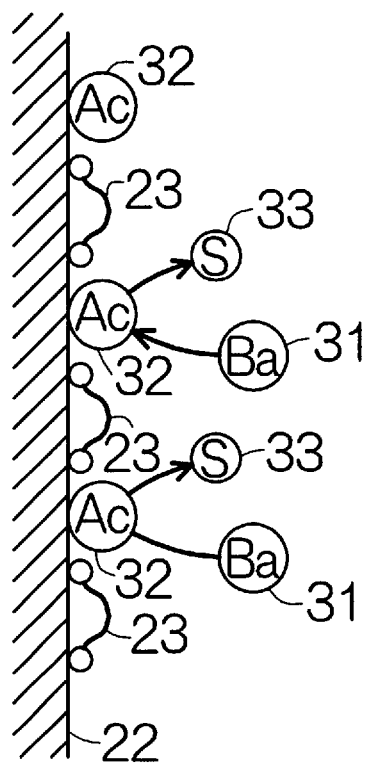
FIG. 4 illustrates the process of washing off organic acid molecules from the surface of the magnetic recording disk.

Thereafter, the magnetic recording disk 22 is brought into the washing apparatus 18. The magnetic recording disk 22 is dipped into the solution 19 containing the base. As shown in FIG. 4, the bases 31 in the solution 19 are allowed to act on organic acid molecules 32, such as oxalic acid molecules, acetic acid molecules, and the like, existing on the surface of the magnetic recording disk 22 as well as within the lubricant film on the magnetic recording disk 22. The organic acid molecules 32 are thus transformed into salts 33. The organic acid molecules 32 are consumed in this manner. The organic acid molecules 32 are thus washed off from the surface of the magnetic recording disk 22 and out of the lubricant film. In particular, if the ultraviolet rays are radiated over the DLC surface layer of the magnetic recording disk 22 as well as the lubricant film in the aforementioned manner, organic acid molecules 32 in quite a quantity may be generated on the magnetic recording disk 22 and in the lubricant film.

Figure 5:
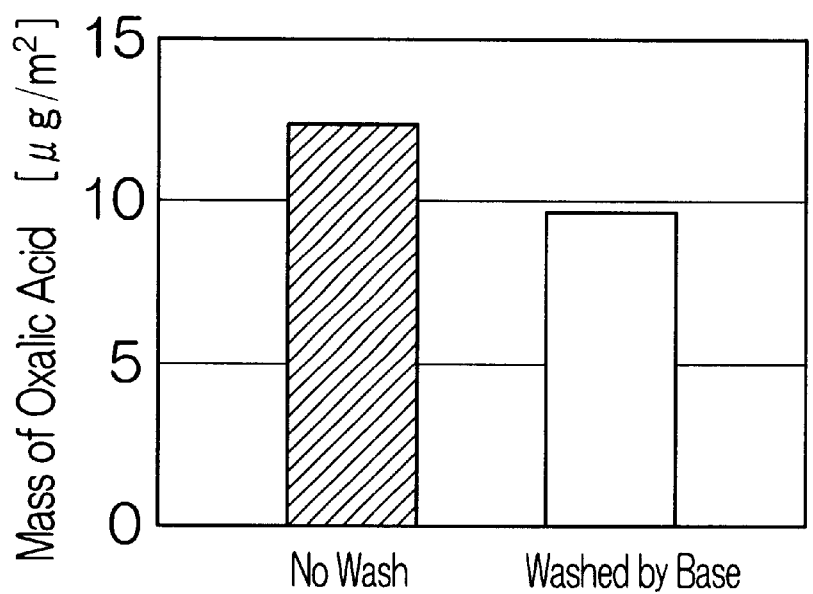
FIG. 5 is a bar diagram illustrating the mass of oxalic acid remaining on the surfaces of the magnetic recording disks.

The inventors have conducted an experiment to prove the effect of the washing in the solution 19. In the experiment, the quantity of oxalic acid was measured on the magnetic recording disk 22 after the magnetic recording disk 22 had been dipped into the solution 19. Ion chromatography was utilized to measure the quantity of oxalic acid. A comparative example was also prepared in the experiment. The quantity of oxalic acid was measured right after a magnetic recording disk of the comparative example had been irradiated with the ultraviolet rays 27. The magnetic recording disk of the comparative example was not dipped into the solution 19 prior to measurement. As is apparent from FIG. 5, it has been proved that the solution 19 containing the base 31 is effective to reduce the quantity of oxalic acid on the magnetic recording disk 22.

Figure 6:
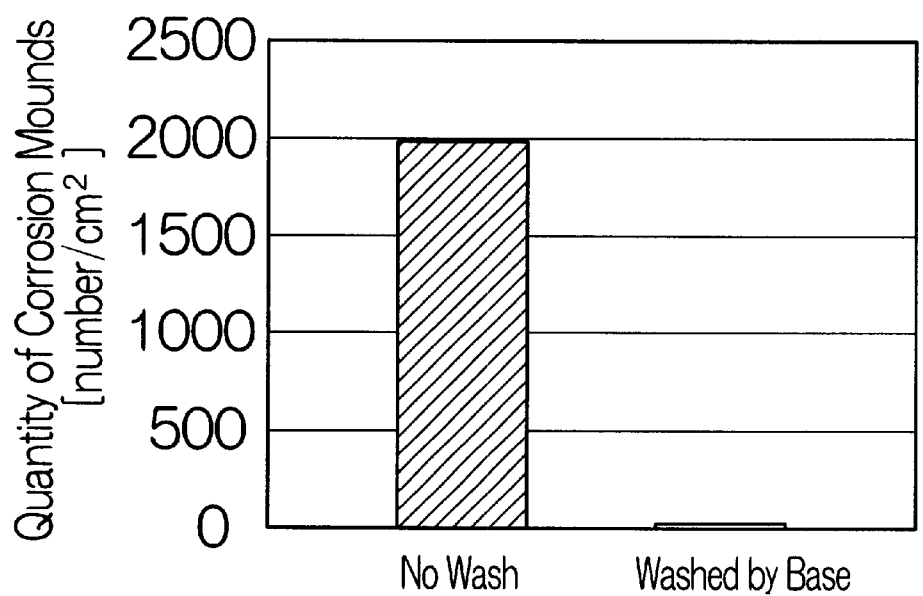
FIG. 6 is a bar diagram illustrating the number of corrosion mound generated on the surf aces of the magnetic recording disks.

The inventors have counted corrosion mounds due to sweat on the surface of the magnetic recording disk 22 according to the invention. The inventors also counted corrosion mounds on the surface of the magnetic recording disk of the comparative example. Prior to the count, the magnetic recording disks were left in the atmosphere of a higher temperature and a higher humidity. The temperature was set at 80 degrees Celsius. The humidity was set at 95%. The magnetic recording disks were left in the atmosphere for two hours. As is apparent from FIG. 6, it has been proved that the solution 19 containing the base 31 is remarkably effective to reduce the quantity of the corrosion mounds on the magnetic recording disk 22.

What is claimed is:

1. A method of surface treatment for a recording medium, comprising:

radiating an ultraviolet ray over a lubricant film formed on the surface of the recording medium; and subjecting the recording medium to exposure to a base after radiation of the ultraviolet ray.

2. The method of surface treatment according to claim 1, wherein said base is a weak base.

3. The method of surface treatment according to claim 1, wherein said base is an amine compound.

4. The method of surface treatment according to claim 1, wherein said base is an aliphatic amine compound.

5. The method of surface treatment according to claim 1, wherein said recording medium is dipped into a solution including the base.

6. The method of surface treatment according to claim 5, wherein a solvent of the solution is a hydrofluoroether compound.

7. The method of surface treatment according to claim 1, wherein said lubricant film comprises a perfluoroether compound.

8. The method of surface treatment according to claim 1, wherein said ultraviolet ray has a wavelength equal to or smaller than 200 nm.

* * * * *

UNITED STATES PATENT AND TRADEMARK OFFICE
CERTIFICATE OF CORRECTION

PATENT NO. : 6,511,716 B1
DATED : January 28, 2003
INVENTOR(S) : Itai et al.

It is certified that error appears in the above-identified patent and that said Letters Patent is hereby corrected as shown below:

<u>Title page,</u>
Item [57], ABSTRACT,
Line 3, delete "bases." and insert -- base. --

Signed and Sealed this

Twenty-eighth Day of October, 2003

JAMES E. ROGAN
*Director of the United States Patent and Trademark Office*